(12) United States Patent
Curts

(10) Patent No.: US 7,530,621 B1
(45) Date of Patent: May 12, 2009

(54) PICK-UP TRUCK BED COVER

(76) Inventor: Keith L. Curts, 807 Trumbull, St. Clair, MI (US) 48079

( * ) Notice: Subject to any disclaimer, the term of this patent is extended or adjusted under 35 U.S.C. 154(b) by 204 days.

(21) Appl. No.: 11/250,077

(22) Filed: Oct. 13, 2005

Related U.S. Application Data

(60) Provisional application No. 60/712,490, filed on Aug. 30, 2005, provisional application No. 60/617,745, filed on Oct. 13, 2004.

(51) Int. Cl.
*B60P 3/34* (2006.01)
*B60P 7/02* (2006.01)

(52) U.S. Cl. .............. 296/100.1; 296/173; 296/32; 296/104

(58) Field of Classification Search ......... 296/100.1, 296/100.09, 100.06, 26.06, 26.04, 26.02, 296/173, 165, 32, 36, 104
See application file for complete search history.

(56) References Cited

U.S. PATENT DOCUMENTS

| | | | |
|---|---|---|---|
| 3,069,199 A | 12/1962 | Reardon et al. | |
| 3,628,828 A * | 12/1971 | Page et al. | 49/381 |
| 3,765,717 A * | 10/1973 | Garvert | 296/100.07 |
| 3,768,858 A * | 10/1973 | Boismier | 296/100.09 |
| 3,995,890 A * | 12/1976 | Fletcher | 296/10 |
| 4,083,596 A * | 4/1978 | Robertson | 296/100.1 |
| 4,284,303 A * | 8/1981 | Hather | 296/100.17 |
| 4,346,529 A | 8/1982 | Keller | |
| 4,531,775 A | 7/1985 | Beals | |
| 4,542,911 A | 9/1985 | Mulligan | |
| 5,011,214 A * | 4/1991 | Friesen et al. | 296/100.09 |
| 5,110,021 A * | 5/1992 | Dawson, Jr. | 224/405 |
| 5,322,336 A | 6/1994 | Isler | |
| 5,344,159 A | 9/1994 | Powell | |
| 5,364,156 A | 11/1994 | Zerow | |
| 6,095,587 A | 8/2000 | Shirlee et al. | |
| 6,106,051 A | 8/2000 | Miskowic | |
| 6,224,140 B1 * | 5/2001 | Hoplock | 296/100.17 |
| 6,254,169 B1 * | 7/2001 | Arthur | 296/100.07 |
| 6,428,079 B1 * | 8/2002 | Van Dyke | 296/100.06 |
| 6,435,594 B1 * | 8/2002 | Ekonen et al. | 296/100.09 |
| 6,471,282 B2 | 10/2002 | Hanning | |
| 6,598,930 B1 * | 7/2003 | Tilton | 296/100.06 |
| 6,663,160 B2 * | 12/2003 | Yarbrough et al. | 296/100.06 |
| 6,783,169 B1 * | 8/2004 | Marx et al. | 296/100.09 |
| 6,929,303 B1 | 8/2005 | Sharples | |
| 2001/0038225 A1 * | 11/2001 | Muirhead | 296/100.06 |

* cited by examiner

*Primary Examiner*—Glenn Dayoan
*Assistant Examiner*—Gregory Blankenship
(74) *Attorney, Agent, or Firm*—Jason E. Hardiman

(57) ABSTRACT

A bed cover assembly is provided for a vehicle, including a frame having a pair of side rails and a center rail. The pair of side rails is releasably mountable to the bed of the vehicle without leaving permanent holes in the vehicle. A pair of covers is pivotally connected to the side rails. A pneumatic cylinder operatively connected to the side rails and covers for moving the covers between an open and closed position. A soft cargo cover is mountable to the pair of covers when the pair of covers is in the open position.

14 Claims, 15 Drawing Sheets

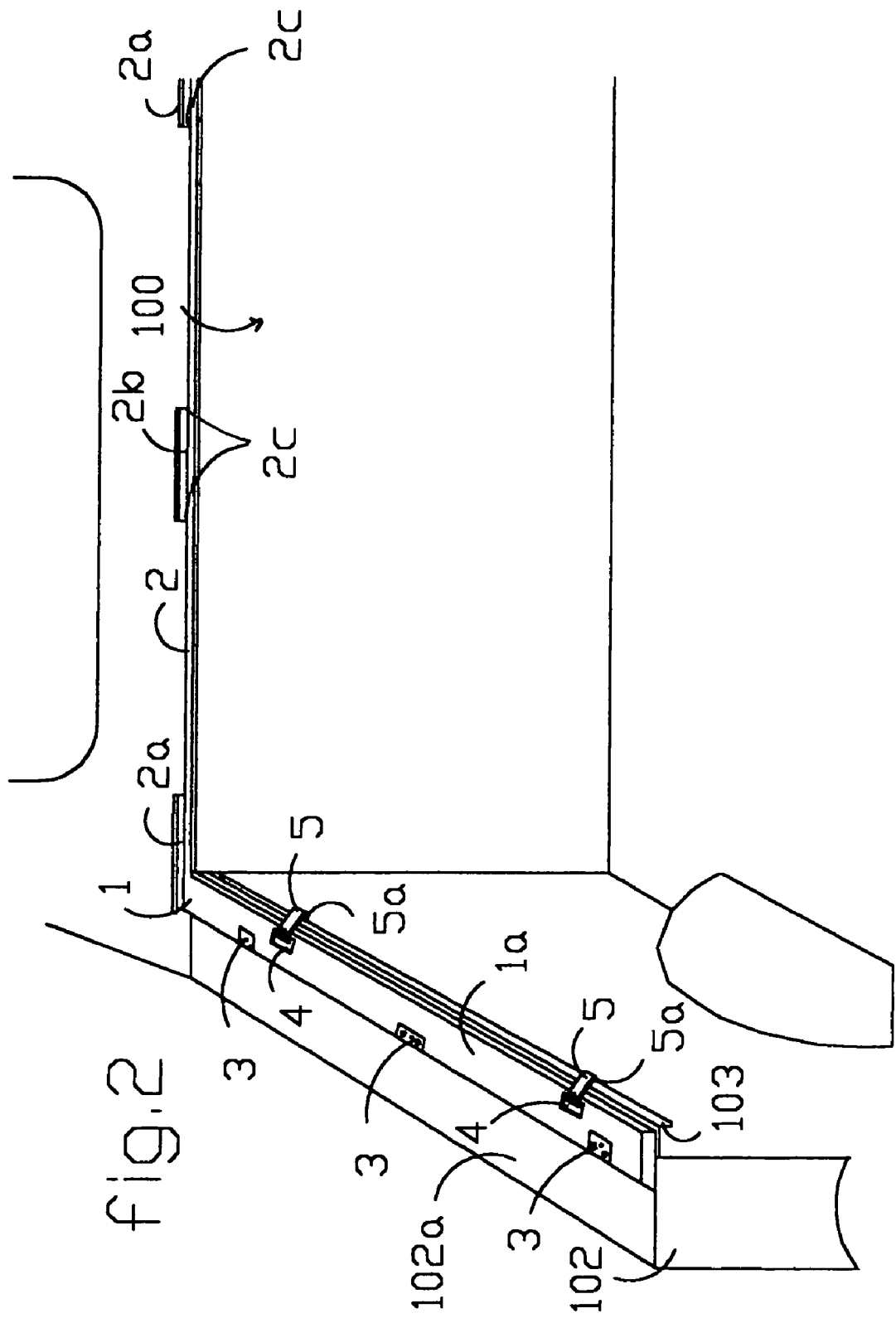

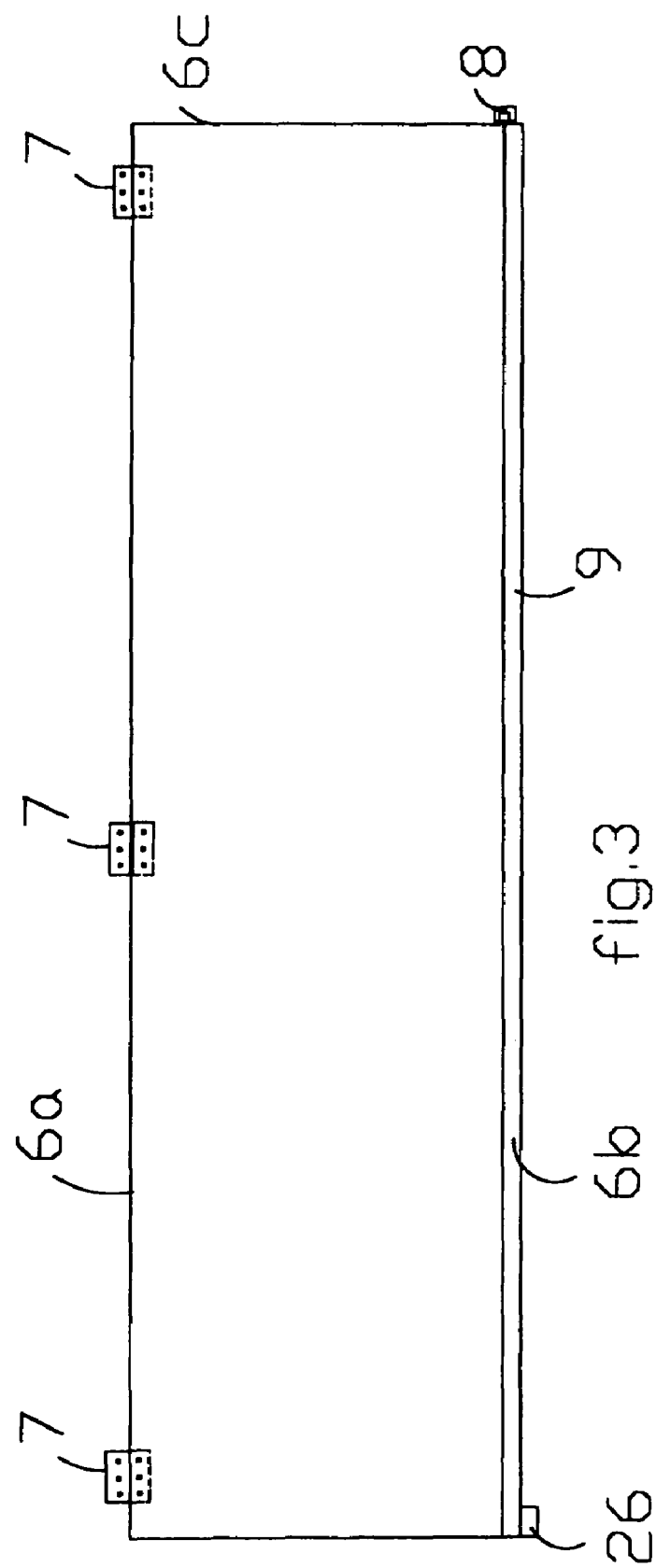

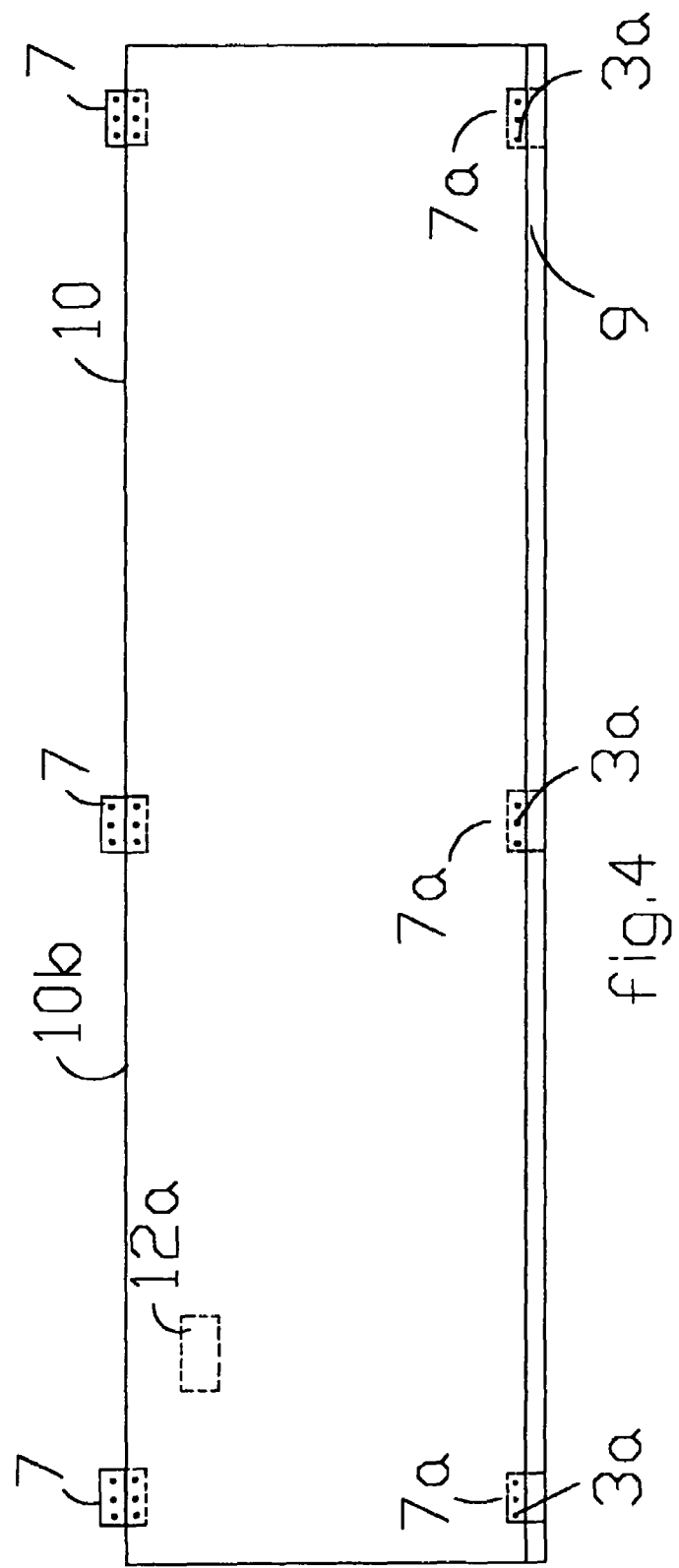

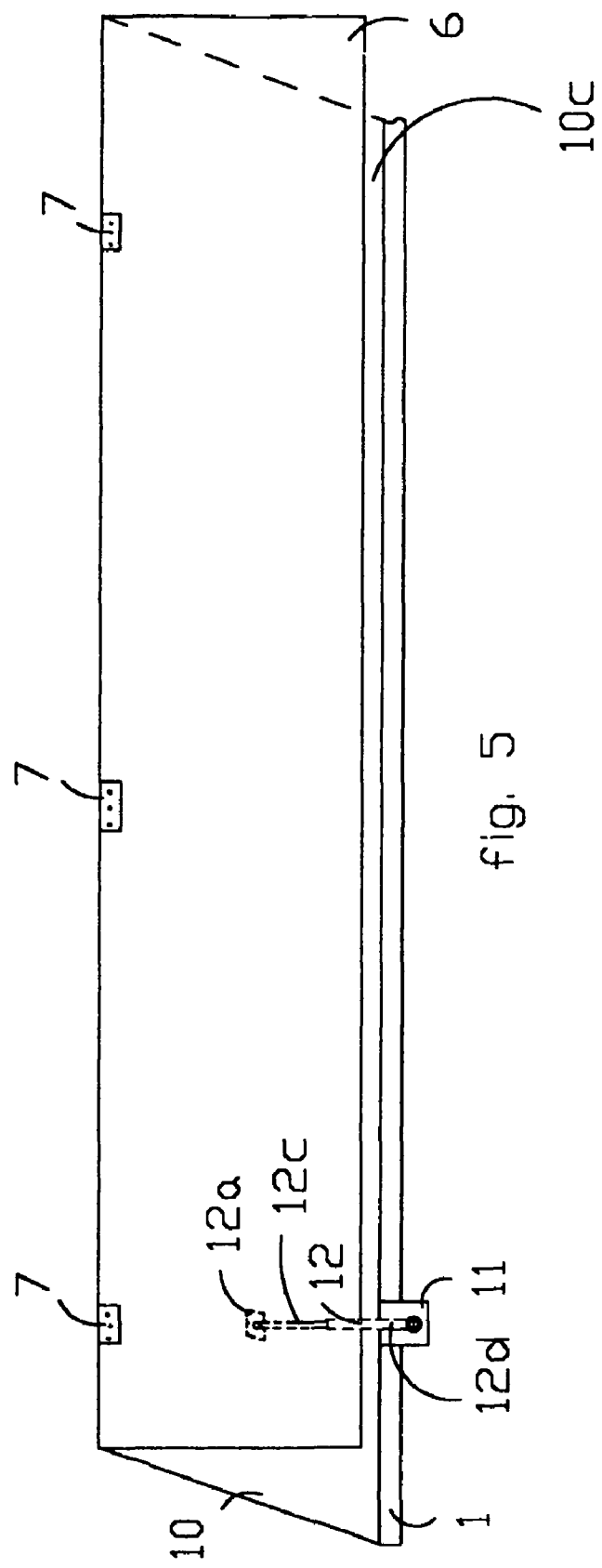

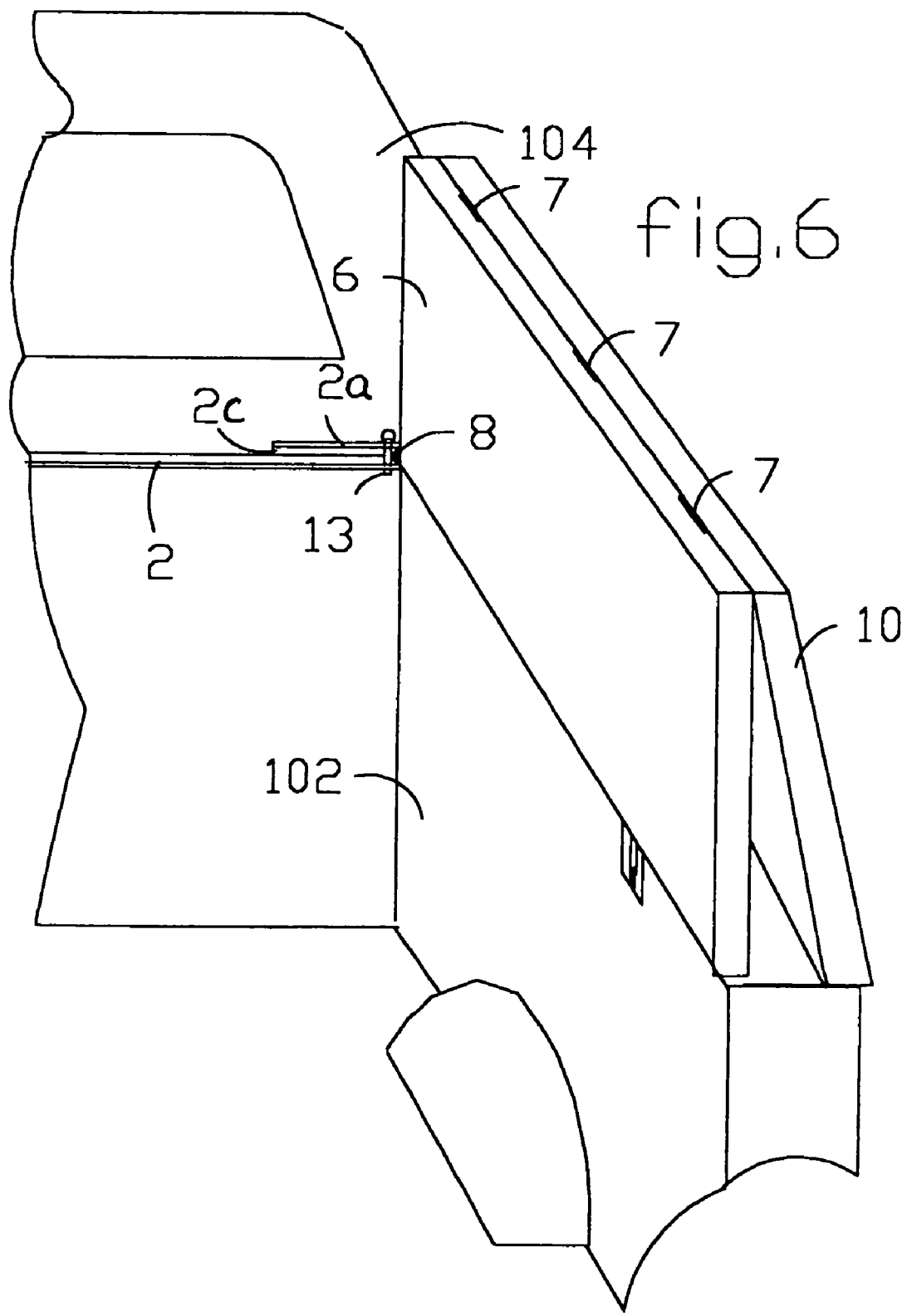

PICK-UP TRUCK BED COVER

This application claims priority of provisional patent application Ser. No. 60/617,745 filed Oct. 13, 2004 and Ser. No. 60/712,490 filed Aug. 30, 2005, the contents of which are incorporated herein in their entirety.

BACKGROUND OF THE INVENTION

It is often desirable, or even required, that a bed of a pickup truck includes a cover to protect any contents within the vehicle bed from the weather or theft. There are numerous designs of bed covers available in the market. However, current vehicle bed covers require mounting devices to the vehicle that incur permanent holes, brackets, or marks on the vehicle. This prevents the previous bed covers to be used on leased vehicles; or to be easily transferred from one vehicle to another.

In addition, current bed covers do not allow for conversion of the vehicle bed when the bed cover is installed.

SUMMARY OF THE INVENTION

It is the intent of the invention to address the aforementioned issues.

In one aspect of the invention, a cover assembly for a bed of a vehicle is provided where the bed has at least a pair of sidewalls. The cover assembly includes a U-shaped frame releasably mountable to the bed along the sidewalls. The U-shaped frame has a pair of elongate side rails and a center rail connecting ends of each of the side rails. The assembly further includes a cover having a first pair of panels connected to one side rail and a second pair of panels connected to the second side rail. A pneumatic cylinder is operatively connected to each of the first and second pair of panels for moving the first and second pairs of panels between a closed and open position.

In another aspect of the invention, a molding strip is disposed between the first pair of panels and a molding strip is disposed between the second pair of panels for preventing fluid leakage between adjacent panels.

In yet another aspect of the invention, each of the first and second pair of panels include an outside panel connected to a side rail of the frame along one lateral edge and an inside rail hingedly connected to the outside rail along an opposing lateral edge.

In another aspect of the invention, when the pair of panels are locked in the open position, the inner panel and outer panel form a triangular formation with a gap therebetween for providing an air pathway to reduce wind resistance.

In a further aspect of the invention, the cover assembly includes means for converting the vehicle bed to a camper, wherein the means include a batten having one end inserted between the outside panel and inside panel of the first pair of panels and an opposing end of the batten inserted between the outside panel and the inside panel of the second pair of panels wherein the first end of the second pair of panels are in the open position to form sidewalls of the camper.

In yet another aspect of the invention, a soft cargo cover is provided for placement over the battens and means for connecting the cover to the sidewalls to secure the cargo cover in place.

Other configurations of the previous pickup bed covers do not allow the bed cover to remain in the open position while the vehicle is moving. And in those bed covers that did allow the vehicle to move while the bed cover was open does not provide a stable configuration which does not increase wind resistance.

BRIEF DESCRIPTION OF THE DRAWINGS

The description herein makes reference to the accompanying drawings wherein like reference numerals refer to like parts throughout the several views, and wherein:

FIG. 2 is a perspective view of a truck showing a portion of the rectangular frame installed in a bed of the pick-up truck;

FIG. 3 is a top view of an inside panel used as a portion of the panel cover;

FIG. 4 is a top view of an outside panel used as a portion of the panel cover;

FIG. 5 is a side view of a gas cylinder connected to the outside panel.

FIG. 6 is a perspective view showing a portion of the pick-up truck bed and a portion of the inside and outside panels connected along one sidewall of the bed frame;

DETAILED DESCRIPTION OF THE PREFERRED EMBODIMENT

Figure 1:
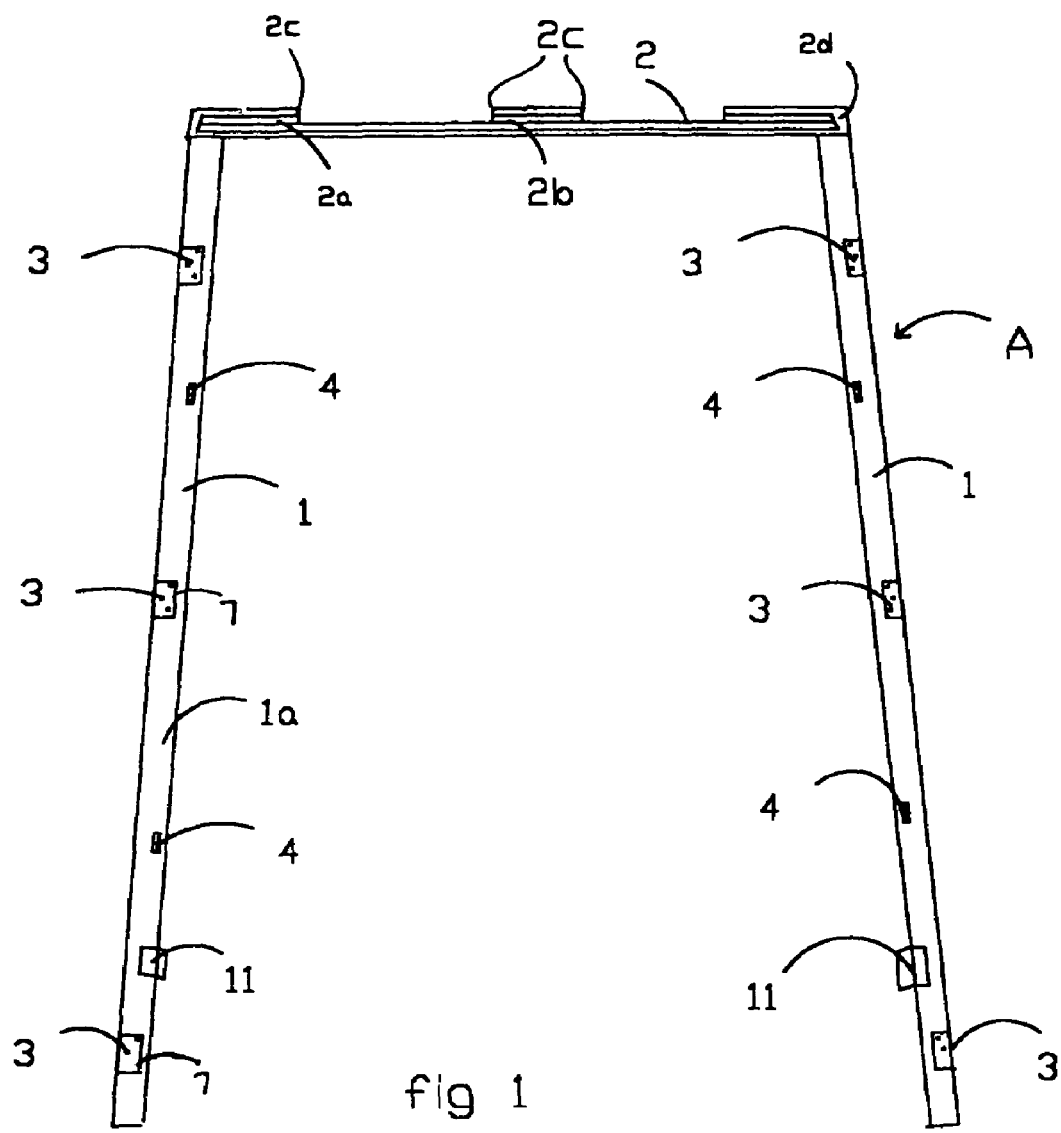
FIG. 1 is a top view of an open, rectangular frame for the pick-up truck bed panel cover according to the present invention.
Figure 1A:
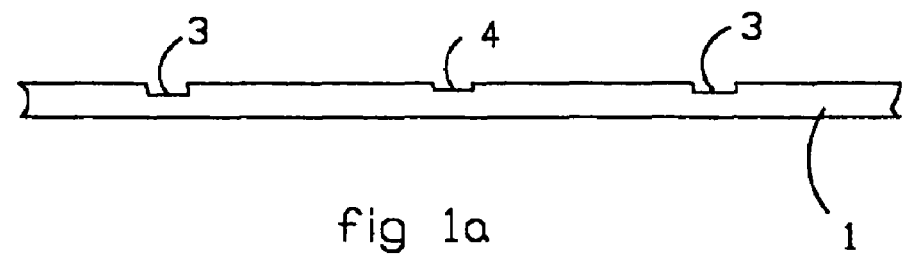
FIG. 1a is a schematic of a side portion of a side rail of the frame showing recesses for hinges and clamps.

Although the bed cover assembly is herein disclosed with reference to a pick up truck, the cover assembly may be used in any vehicle, motorized or unmotorized, having an open cargo area surrounded by at least three sides. Examples of an unmotorized vehicle are a trailer or wagon.

Looking especially at FIGS. 1-11, the invention of a hard panel cover assembly 200 includes an open rectangular frame (A), having a pair of side rails 1 and a center or front rail 2. The side rails 1 are mountable to the upper surface 102a of the sidewalls 102 of the pick-up truck bed 100 without requiring permanent brackets, welds, holes, or other features that cause damage to the pick-up truck. For this reason, the pick-up truck bed panel cover 200 can also be used on rental or leased vehicles. The side rails 1 have a plurality of recesses 3 and 4 on an upper surface 1a for positioning hinges 7 and clamps 5 within the respective recesses 3, 4. The recesses 3 and 4 maintain the hinges 7 and clamps 5 flush with the upper surface 1a of the side rails 1. As seen in FIG. 2, clamps 5 are bolted within the recess 4. The clamps 5 have a lip 5a for hooking around and securing to a lip 103 in the interior surface of the sidewall 102 of the pick-up truck bed 100. In a trailer or wagon, the lip 103 may also encompass an underside groove or opening between slats.

Figure 8:
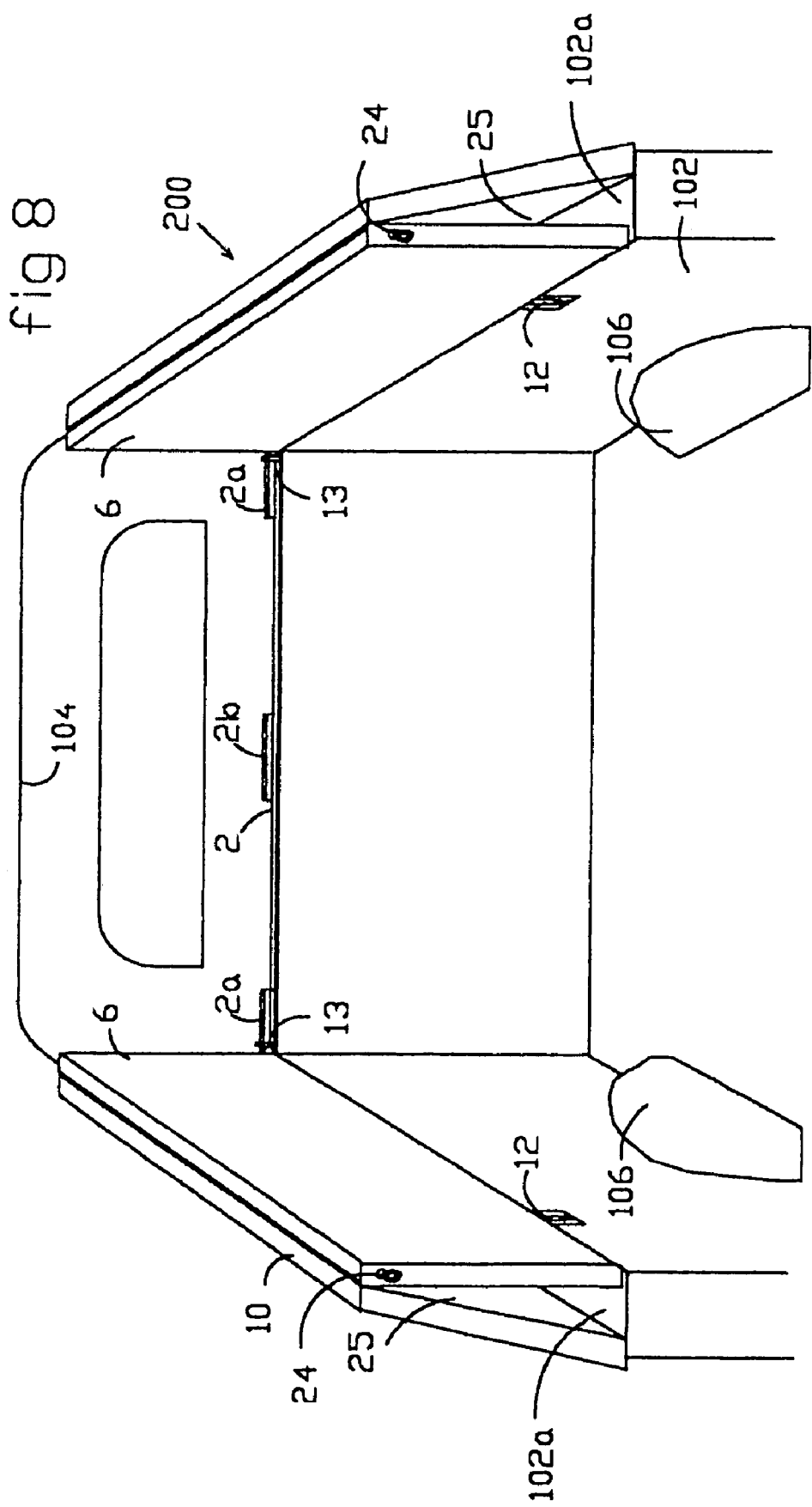
FIG. 8 is a perspective view showing the pick-up truck bed having inside and outside panels connected to the frame at each sidewall of the pick-up truck bed, wherein the panels are in an open position.
Figure 11:
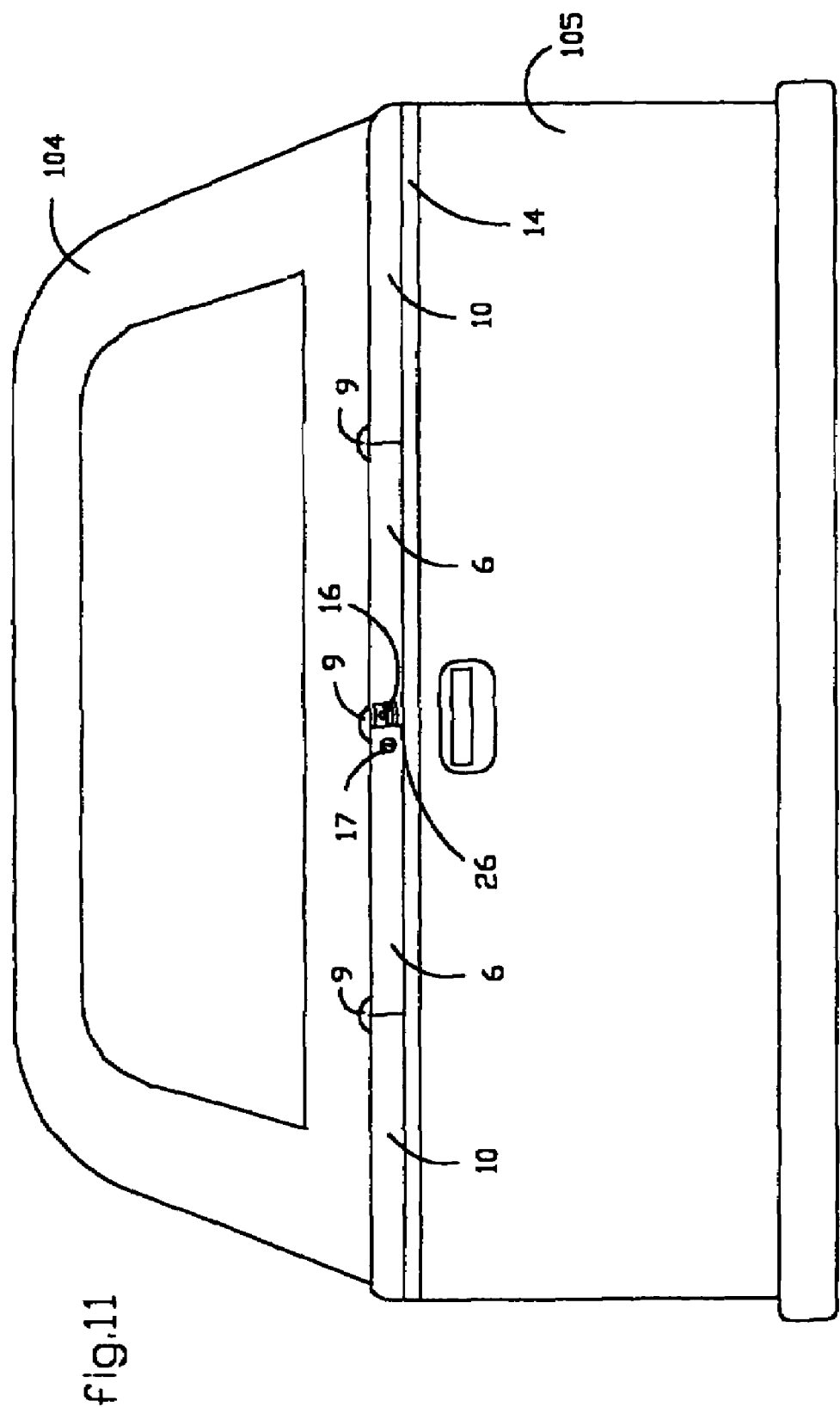
FIG. 11 is a rear view of the pick-up truck bed with the panel cover in the closed position.
Figure 12:
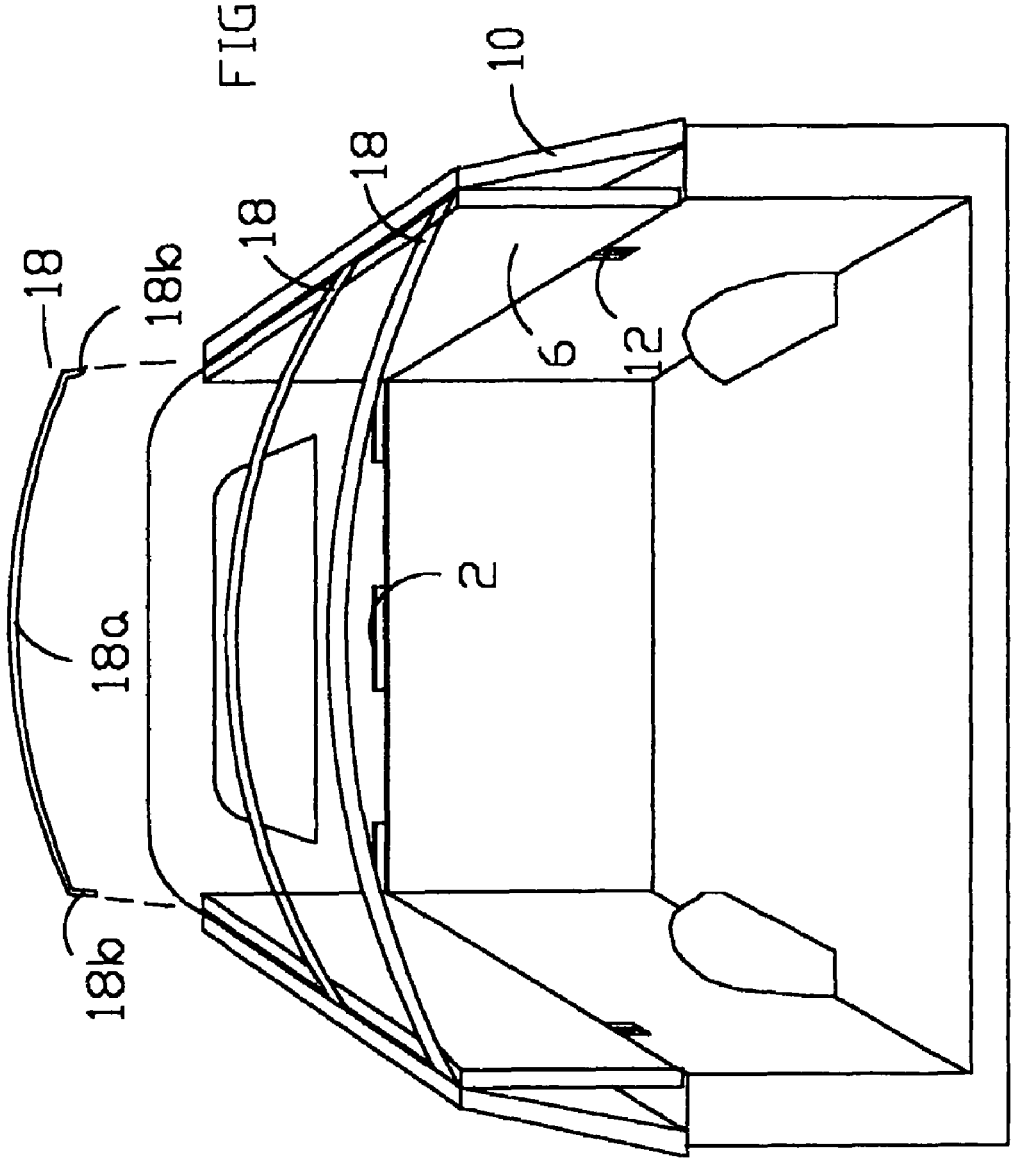
FIG. 12 is a perspective view of the pick-up truck bed showing certain features for an optional soft cover.

The hard panel cover of the assembly includes four panels, having a pair of outside panels 10 and a pair of inside panels 6 as shown in FIG. 8. An outside panel 10 is pivotally connected to an inside panel 6. The outside panel 10 is also pivotally connected to a side rail 1. The pair of inside panels 6 meet and lay adjacent to each other when the panel cover is in the closed position as shown in FIG. 11.

FIG. 3 shows one inside panel 6. The pair of inside panels 6 are identical and mirror images of each other except the optional lock configuration and only one inside panel 6 has a level 26 as discussed hereinafter. Each inside panel 6 has a plurality of hinges 7 connected along one longitudinal edge 6a of the panel 6 for connection to the adjacent outside panel 10. In the illustrated embodiment, three hinges 7 are shown along one longitudinal edge 6a of the panel 6. On the opposing longitudinal side 6b is a T-molding strip 9, for preventing fluid leakage between the pair of inside panels 6, when the panel cover is in the closed position, as will be discussed hereinafter. Along a front edge 6c of the inside panel 6 and preferably adjacent to the longitudinal side 6b, there is a cam bearing 8 extending from the edge 6c to facilitate movement of the panel cover between open and closed positions and to further facilitate maintaining the panel 6 in either the open or closed position.

Returning to FIG. 1, the frame includes a front or center rail 2 connected between the two side rails 1. The front rail 2 is not physically attached to the pick-up truck bed 10. Front rail 2 is securely attached to the ends of each side rails 1. The front rail 2 is configured to have a pair of channels 2a adjacent each side rail 1. The channels 2a extend approximately six inches toward the center of rail 2. Front rail 2 also has a center channel 2b measuring less than six inches long. At each end of the center channel 2b and at each inside edge of grooves 2a are ramps 2c. The channel or channels 2a and 2b are sized and configured for receiving the cam bearings 8. As the inside panels 6 move between an open and closed position, the cam bearing 8 rolls along inside surface 2d of front rail 2. As the cam bearing 8 moves along the front rail 2, a portion of the bearing 8 may wander out of the peripheral edge of the rail 2. For this reason, it is preferred to not have a continuous groove across the length of front rail 2 to prevent the panels 6 from binding in the channels. However, it is preferred that the cam bearing 8 is correctly aligned when the inside panel 6 is in the completely opened or closed positions. Therefore, channels 2a and 2b are provided to maintain the cam bearings 8 in place at these positions. The cam bearings 8 are in channels 2a when the cover is in the open position; and the cam bearings 8 are disposed in channel 2b when the cover is in the closed position. The ramps 2c facilitate the entry and exit of the cam bearings 8 into and out of the channels 2a and 2b.

FIG. 4 shows one of the outside panels 10 which is the mirror image of the other outside panel 10. The outside panel 10 is connected along one longitudinal end 10a by hinges 7 to one of the side rails 1. On an opposing longitudinal side 10b from the hinges 7, the longitudinal edge 10b is covered by a T-molding strip 9. Underneath the T-mold strip 9 are predetermined recesses 3a and apertures 7a for connecting the hinges 7 from the inside panel 6. On an inside surface 10c of the outside panel 10, a bracket 12a is secured for receiving and securing an end of a pneumatic cylinder 12.

FIG. 5 shows a pneumatic cylinder 12 having one end portion, at the cylinder housing 12d, pivotally connected to bracket 11 which is connected to the surface of the side rail 1 of frame (A). The cylinder 12 has an opposing end at the piston rod 12c pivotally connected to the bracket 12a on the outside panel 10. The bracket 11 secures the pneumatic cylinder 12 so that the cylinder housing 12d extends partially into the bed 100 and adjacent the sidewall 102. When the cover moves to a closed position, the cylinder housing 12d pivots about the bracket 11 out of the way to allow the cover 6, 10 to close as a planar unit. The pneumatic cylinder 12 is orientated so that as the piston rod 12c extends out of the cylinder housing 12d, the outside panel 10 pivots to move the panel 10 from an essentially horizontal to a vertical and opened position. As the piston rod 12c retracts into the cylinder housing 12d, the piston 12c carries the outside panel 10 toward a horizontal position. The inside panels 6 move in response to the movement of the outside panels 10 to either the open or closed positions. The pneumatic cylinder 12 may be connected to a pump (not shown) for automatic activation to open or close the cover.

FIG. 6 shows one sidewall of the pick-up truck bed with inside and outside panels 6 and 10, respectively. The panels 6, 10 are in the open position. FIG. 6 also shows the cam bearing 8 within the channel or recess 2a. When the pair of panels 6 and 10 are in the open position, a pin 13 traverses the channel 2a and locks the cam roller 8 adjacent to the sidewall 102 of the pick-up truck bed so that the panels 6 and 10 cannot inadvertently move to the closed position. The pin 13 is manually installed by the user. In most pick-up truck beds 100 or other vehicles, there will be a gap between the end of panels 6 and 10 and the cab 104 to allow the user's hand and arm to fit therebetween and install or remove pin 13. As seen in FIG. 16, there may be a pair of pins at each end of front rail 2. Pin 13a may act as a stop for panel 6 to maintain an angular relationship between the inside panel 6 and outside panel 10. Pin 13 prevents inside panel 6 from moving to the closed position. Therefore, when in the open position, inside panel will be restricted between pins 13 and 13a.

Figure 7:
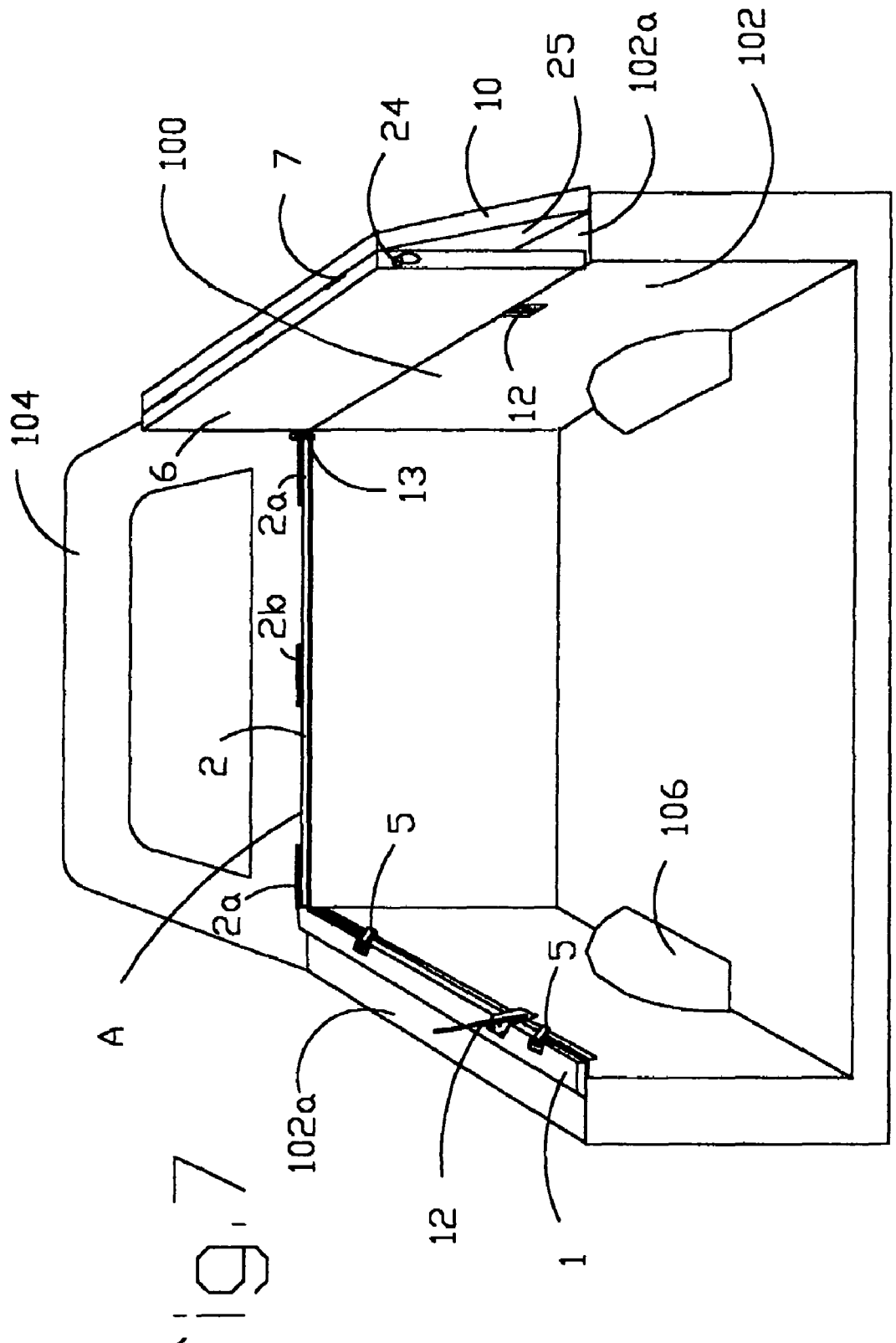
FIG. 7 is a perspective view of the pick-up truck bed showing an inside and outside panel connected to one side of the frame and showing certain components along the opposing side of the frame.

FIG. 7 shows a pick-up truck bed 102 having the frame (A) installed and one set of panels 6 and 10 attached to one of the side rails 1 and the other side rail without the panels 6 and 10 installed to show certain other features. As can be seen in FIG. 7, the front rail 2 usually is disposed against the cab 104. The pneumatic cylinder 12 is preferably connected to the side rails 1 and outside panels 10 at a location spaced from the front rail 2 and cam roller 8 to provide a higher torque for removing and closing the panels 6, 10. The pneumatic cylinder 12 may also be positioned in the center of side rails 1 as shown in FIG. 16.

Further, FIG. 7 shows that when the panel cover is in an open position, the orientation of the inner panel 6 and the outer panel 10 to the upper surface 102a of the pick-up truck bed 100 forms a narrow triangular formation with a gap 25 formed therebetween. This gap 25 may be maintained by restricting the movement of inside panel 6 between the pins 13 and 13a. This gap 25 provides added strength to the panel pairs 6, 10 when the cover is in an open position so that the panels 6, 10 can withstand crosswinds, especially while the vehicle is in motion. The gap 25 also provides an air pathway to reduce wind resistance as the vehicle is traveling down a road.

FIG. 8 shows the pick-up truck bed having the inside and outside pair of panels 6 and 10, respectively, attached to each side rail 1 on each sidewall 102 of the pick-up bed. It is evident that when the panels are in the open position, the panels 6, 10 do not interfere with the wheel wells 106 nor do the panels reduce the width of the bed. The panels 6, 10 in the open position stand on the side rails 1 and side walls 102 of the vehicle. A typical vehicle has an approximately six-foot wide bed. Therefore, the width of each panel is essentially eighteen inches wide. The added height to the side walls 102 when the cover is in an open position would be approximately 1.5 foot higher than the existing side wall 102 on the vehicle.

Figure 9:
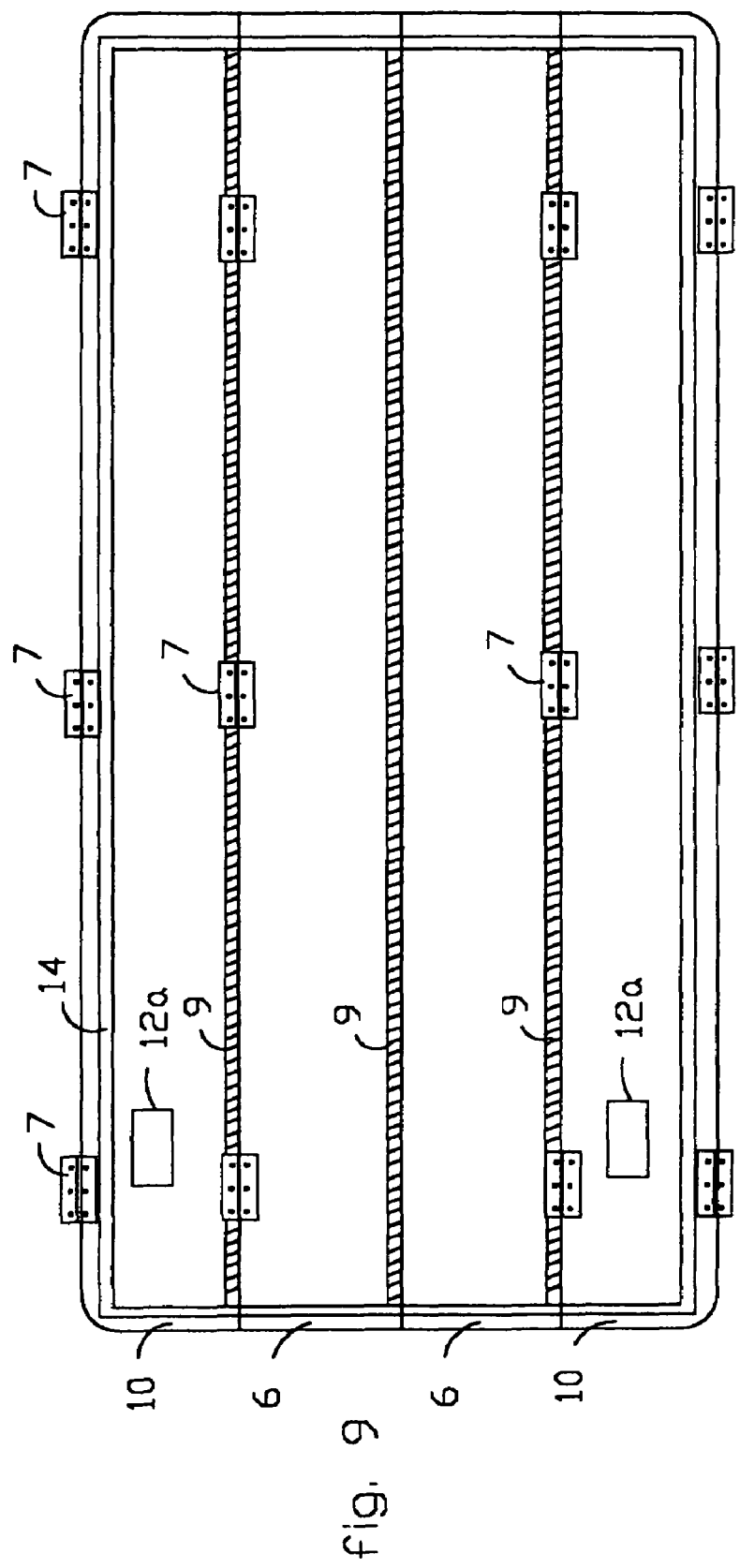
FIG. 9 is a planar view showing the bottom surface of the panel cover when the panels are in a closed position.
Figure 10:
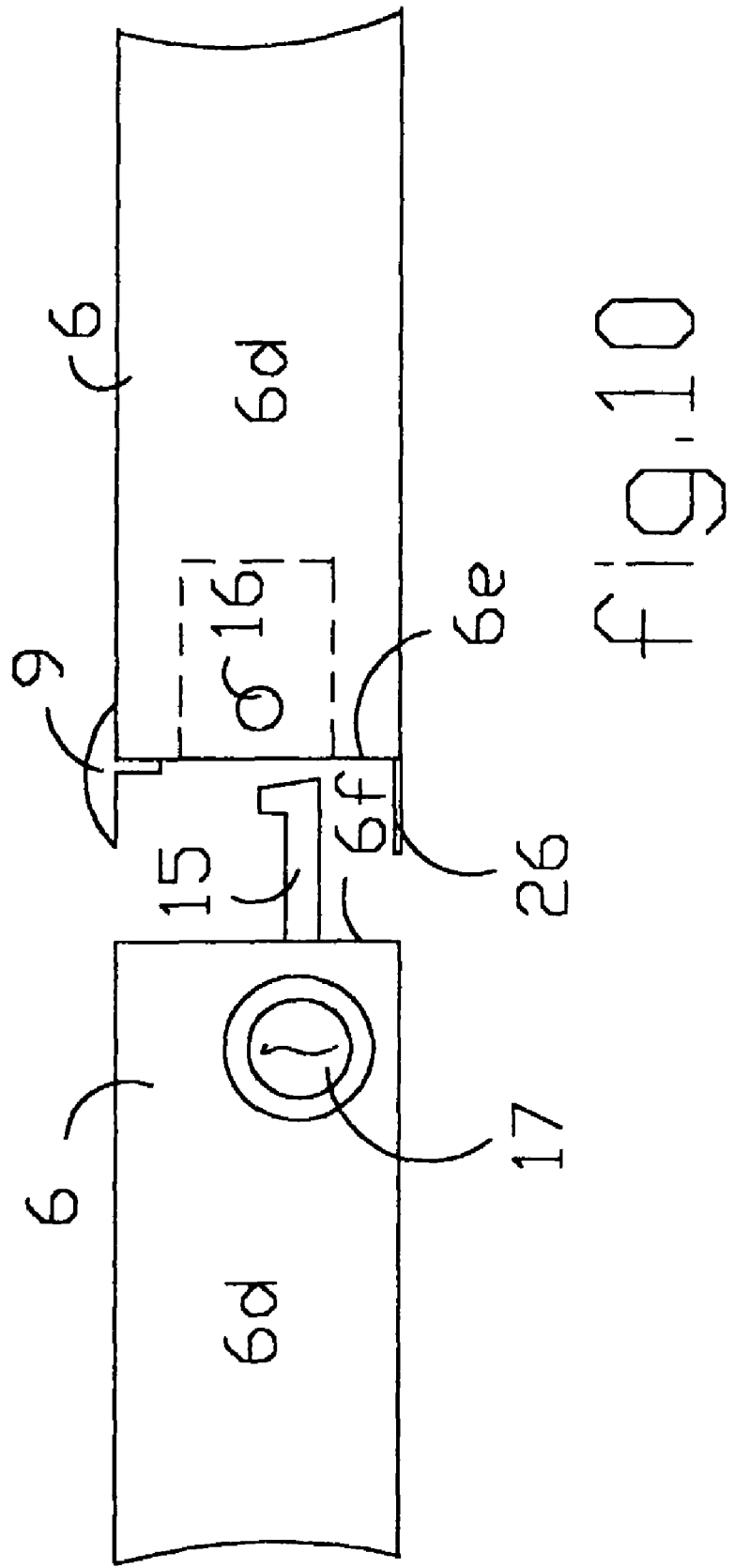
FIG. 10 is a schematic showing certain features on the inside panels of the cover.

FIG. 9 shows a bottom view of all four panels 6, 10 in the closed position. Hollow rubber weather stripping 14 is applied on to the peripheral edge of the panel cover for waterproofing between the outer edges of the panels 6 and 10 to the framed rails 1 and 2 and the fourth wall (which is usually a tailgate 105). The weather stripping 14 is pliable and can bend as the panels 6 and 10 open. Items 9 are T-molding strips as shown in FIG. 10 to prevent fluid leakage from rain, car washes, or other sources from dripping in between adjacent panels. The T-molding strips 9 have an arcuate upper surface 9a to drain fluid away from the seams formed between panels.

FIG. 10 shows an optional lock mechanism for locking the panel cover in a closed position. The locking mechanism includes a lock hook 15 and a lock cylinder 17 installed in one of the inside panels 6; and a lock pin 16 located in an opposing inside panel 6. The relative locations of the lock mechanism components is predetermined for functionality. The lock mechanism is preferably located along the edge 6d of the inside panels 6 adjacent the fourth wall 105. FIG. 10 also shows an optional level 26 attached at one edge of one of the inside panels 6. The level 26 is a rigid member or shelf extending from one edge 6e of an inside panel 6 upon which the outer edge 6f of the opposing inside panel 6 rests thereon for maintaining the panel cover level and in a horizontal position when the panel cover is closed. The level 26 prevents slippage between the pair of inside panels 6.

FIG. 11 shows the paneled cover in a closed position from the rear of the pick-up bed and viewing the tailgate or fourth wall 105.

The panel cover assembly of the present invention also provides an added advantage of being capable of converting to a soft cargo cover 19 for use in camping. Looking at FIGS. 12-15, the soft cargo cover 19 is installed over the pick-up truck bed 100 when the hard paneled cover 200 is in the open position. The panels 6, 10 act as sidewalls for the soft cargo cover 19 to provide added height to the interior of the bed. A plurality of battens 18 are inserted between the inside and outside panels 6 and 10, respectively. The battens 18 having an arcuate center formation 18a with vertical linear ends 18b for inserting between the inside and outside panels 6 and 10, respectively, on each side of the truck bed. The linear ends 18b are also inserted adjacent and between the T-molding strips and one of the inside panels 6 or outside panels 10. Since the T-molding strip 9 is pliable, the battens' ends 18b merely flex the strip 9 at that location. The surface friction of the T-molding strips hold the battens in place. Although three battens 18 are shown distributed among the length of the truck bed, any number of battens may be used to support the soft cargo cover 19.

Figure 13:
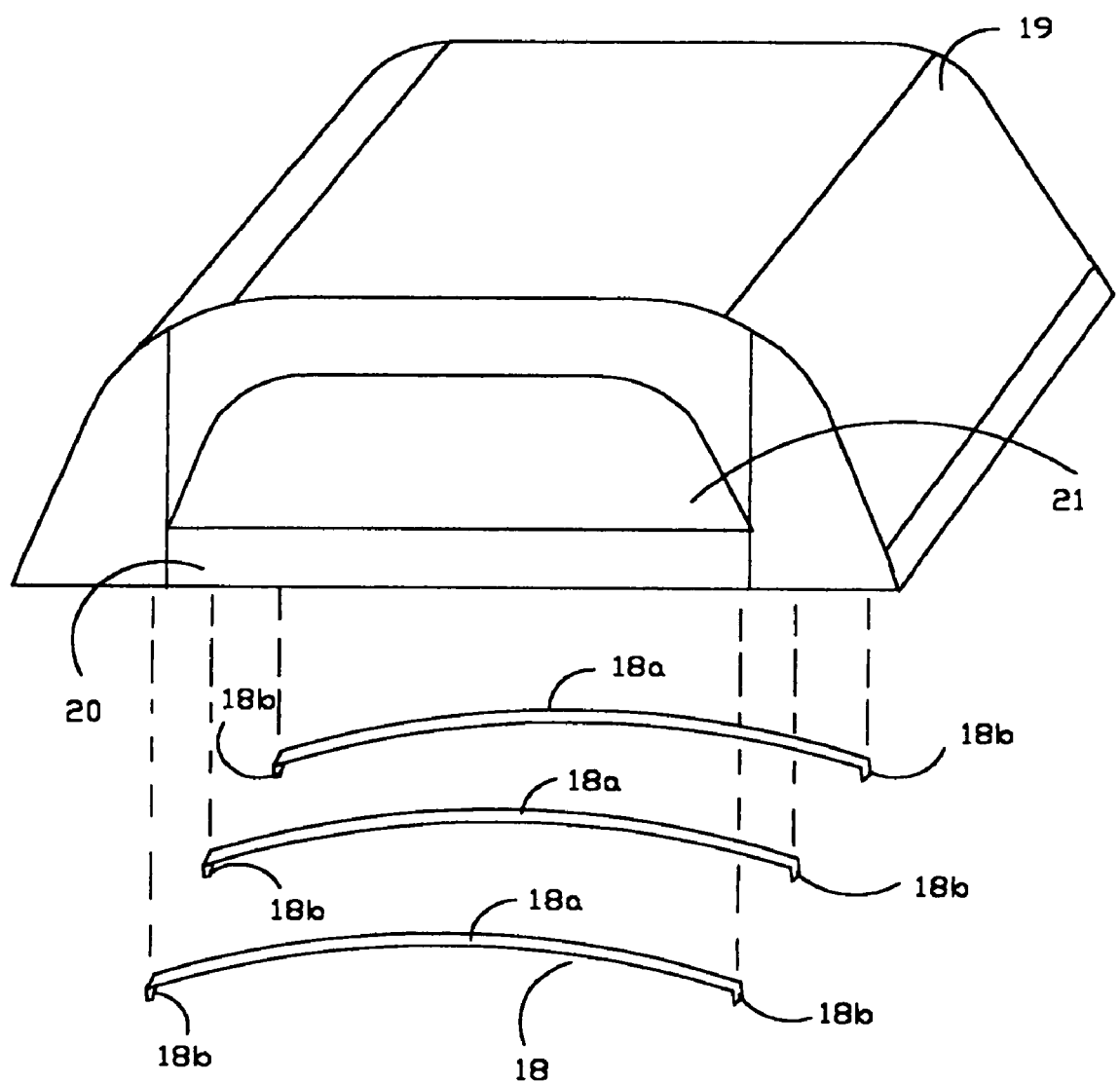
FIG. 13 is an exploded view showing the positioning of battens relative to a soft cover usable with the panel cover.
Figure 14:
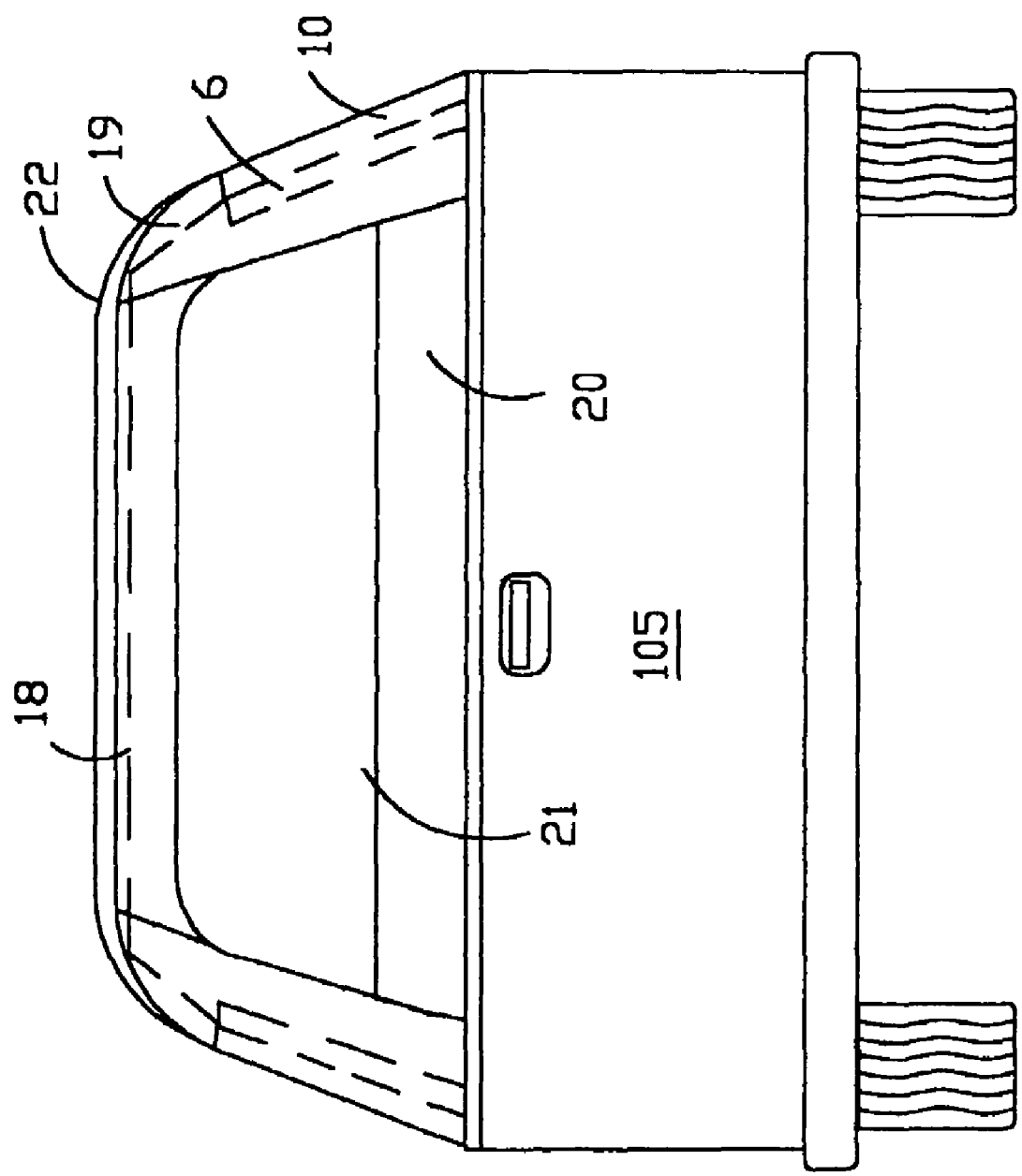
FIG. 14 is a rear view of the soft cover installed on the pick-up truck bed panel cover.

FIG. 13 shows the outside configuration of the soft cargo cover 19. The soft cargo cover is made of a waterproof material which sets on top of the battens and the open panels of the hardcover. The soft cover 19 may have a curtain (not shown) to extend into the bed adjacent to the front rail 2. The soft cover may include a window 21 and flap 20 for entering and exiting the enclosed area of the bed 100. FIG. 14 shows the soft cover 19 on the panels 6 and 10.

Figure 15:
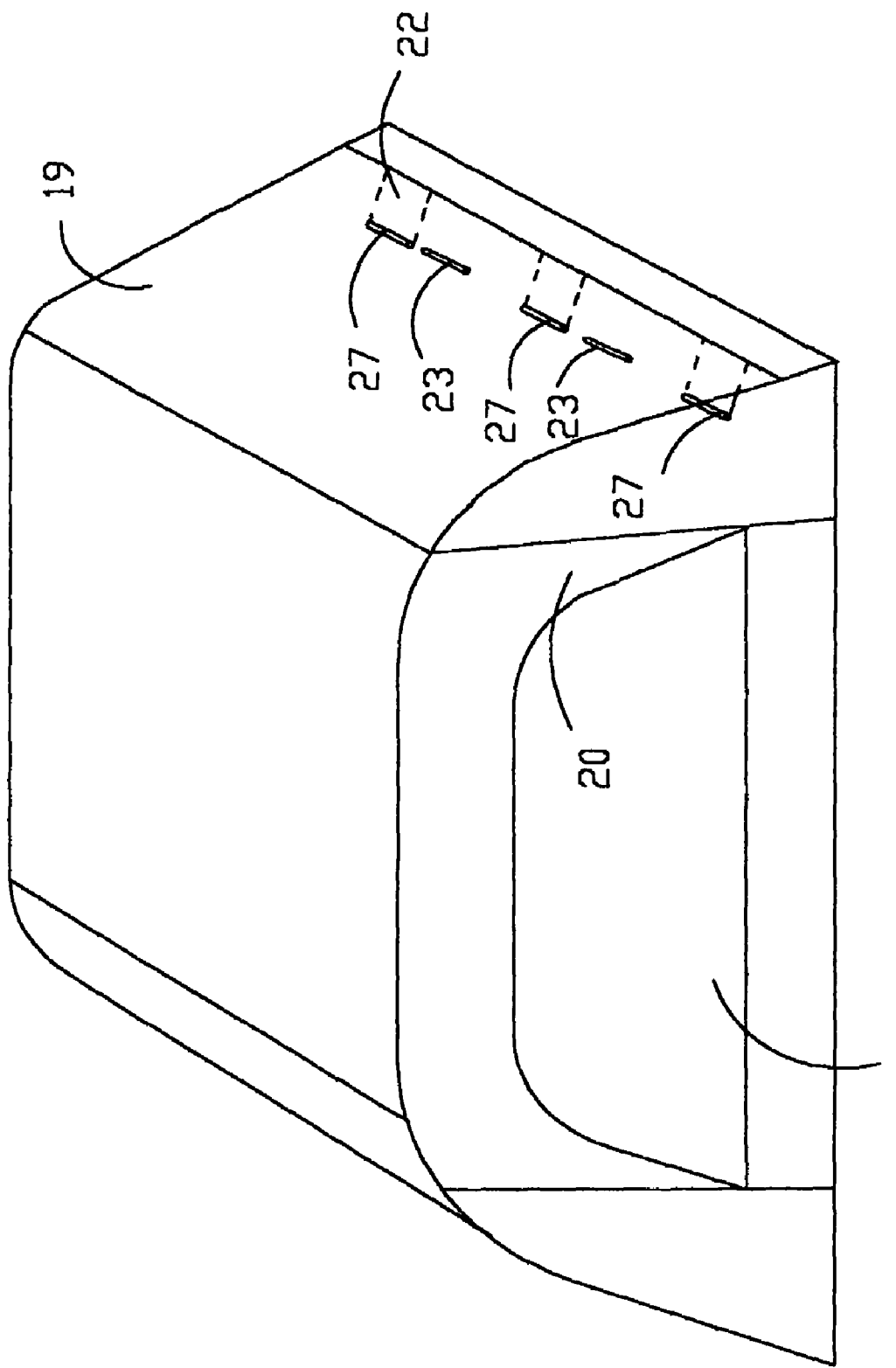
FIG. 15 is a perspective view illustrating certain attachment features for attaching the soft cover on the pick-up truck bed cover.

The soft cover 19 is secured to the hard paneled top by way of tabs 22 shown in FIG. 15. A plurality of tabs 22 are provided along each longitudinal length of the soft cover 19. The tabs 22 are stitched to the inside of the soft cover 19. The tabs 22 are sewn or configured to have through apertures or sleeves 27 at their free ends. The tabs 22 are positioned on the inside surface of the soft cover 19 for inserting between the side rail 1 of the frame A and the outside panel 10. The tabs 22 can be inserted adjacent the pliable weatherproof rubber strip 14. Once the tabs 22 have been inserted between the frame and outside panel 10, the tabs 22 are maintained in position by rods 23 sized and shaped for inserting into the apertures or sleeves 27. The rods 23 prevent the tabs 22 from making their way back in between the outside panel 10 and side rails 1. The tabs 22 are spaced from the edges 25 of the soft cover 19 by a few inches, so that edges 25 overlap a portion of the side walls 102 to prevent the entry of fluid into the bed. The overlap edges 25 directs fluid away from the bed.

The panel cover of the present invention provides numerous advantages over the prior art. Because there is no drilling or cutting to an existing vehicle, the paneled cover may be used on owner's vehicles, rental vehicles or leased vehicles. No special tools are required for installation. The paneled cover provides full access into the bed of the truck when in the open position. There are no support bars to hinder access into the truck bed. The configuration of the frame and the use of the cam roller system in the front rail 2 requires only two parallel sides clamped to the elongate sides of the truck bed. The front rail 2 is not mounted to the truck. A pin lock maintains the panel cover in an open position which forms a pair of vertical triangles when open to reduce wind resistance when the vehicle is in motion. Further, the present invention uses a pneumatic pump upon which, after initial activation or movement of the panels 6 and 10, the pneumatic cylinder automatically moves the panels to an open or closed position. The prior art uses motors and cables to accomplish the same function. As a further assist, a lifting hook 24 (FIGS. 7 and 8) may be attached to an end surface of the inner or outer panel 6, 10. By initially manually moving the hook 24 in the direction desired for the panels 6, 10, the pneumatic cylinder 12 takes over to assist the manual opening or closing of the panel cover.

Another advantage is that the panels can be painted to match the truck and to also be used as a source of advertising. The frame can be collapsed and easily installed or uninstalled by the consumer. The ends of front rail 2 are screwed onto front ends of side rails 1. When the paneled cover assembly 200 is not in use, the assembly 200 can be collapsed by removing the panels from the frame (A) and unscrewing the rails 2 and 1 from each other. When disassembled the bed cover assembly can be stored in a 6 foot by 18 inch by 12 inch space. Finally, although the invention has been discussed in relation to a pick-up truck bed, the paneled cover of the present invention can be also used on small trailers or semi-trailers hauling dirt, gravel, etc.

What is claimed is:

1. A cover assembly for a bed of a vehicle, said bed having a pair of side walls, the assembly comprising:
    a U-shaped frame releasably mounted to the bed along the side walls, said U-shaped frame having a pair of elongate side rails and a center rail connecting at ends of each of the side rails;
    a cover including a first pair of panels connected to the first side rail and a second pair of panels connected to the second side rail;
    a pneumatic cylinder operatively connected to each of the first and second pairs of panels for moving the first and second pairs of panels between a closed and opened positions;

wherein each of the first and second pair of panels include an outside panel connected to a side rail of the frame along one lateral edge and an inside panel hingedly connected to the outside panel along an opposing lateral edge; and wherein when the pair of panels are locked in the open position, the inner panel and outer panel form a triangle formation with a gap therebetween for providing an air pathway to reduce wind resistance.

2. The assembly of claim 1, wherein the U-shaped frame is releasably mountable to the side walls of the bed by at least one of hinges and clamps.

3. The assembly of claim 1, further comprising a molding strip disposed between the first pair of panels and a molding strip disposed between the second pair of panels for preventing fluid leakage between adjacent panels.

4. The assembly of claim 1, wherein the pneumatic cylinder has one end connected to the outside panel and an opposed end connected to the side rail of the frame.

5. The assembly of claim 1, wherein an outer peripheral edge of the first and second pair of panels has a rubber weather stripping applied thereon for waterproofing edges between the panels and the U-shaped frame.

6. The assembly of claim 1, further comprising a locking mechanism for locking the panels when the panels are in a closed position.

7. The assembly of claim 1, wherein one of the inside panels has a rigid shelf extending from an outer edge for receiving a portion of the other inside panel for maintaining the cover level and in a horizontal position when the cover is in a closed position.

8. A cover assembly for a bed of a vehicle, said bed having a pair of side walls, the assembly comprising:
- a U-shaped frame releasably mounted to the bed along the side walls, said U-shaped frame having a pair of elongate side rails and a center rail connecting at ends of each of the side rails;
- a cover including a first pair of panels connected to the first side rail and a second pair of panels connected to the second side rail;
- a pneumatic cylinder operatively connected to each of the first and second pairs of panels for moving the first and second pairs of panels between a closed and opened positions; and
- means for converting the vehicle bed to a camper;
- wherein each of the first and second pair of panels include an outside panel connected to a side rail of the frame along one lateral edge and an inside panel hingedly connected to the outside panel along an opposing lateral edge; and
- said means for converting includes a batten having one end inserted between the outside panel and the inside panel of the first pair of panels and the opposing end inserted between the outside panel and the inside panel of the second pair of panels, wherein the first and second pair of panels are in the open position.

9. The assembly of claim 8, wherein the batten has an arcuate center section.

10. The assembly of claim 8, further comprising a soft cargo cover disposed over the batten.

11. A cover assembly for a bed of a vehicle, said bed having a pair of side walls with upper surfaces and an underside recess and a third wall; said cover assembly comprising:
- a U-shaped frame having a pair of side rails and a center rail, said side rails releasably mountable to upper surfaces of the side walls and said center rail positionable adjacent the third wall;
- a cover including a first pair of panels pivotally connected to one of the side rails and a second pair of panels pivotally connected to the other side rail; and
- a pneumatic cylinder having one end connected to a side rail and another end connected to the cover, said pneumatic cylinder operable for moving the cover between a closed and an opened position;
- wherein the side rails have an upper surface with at least one recess for receiving a clamp secured therein, said clamp having a hooked end for gripping and securing to the underside recess of the bed, and wherein each of the first and second pair of panels include an outside panel and an inside panel.

12. The cover assembly of claim 11, further comprising a roller bearing on one of the panels and a discontinuous channel in the center rail for receiving the roller bearing when the pair of panels are in the opened and closed position.

13. The cover assembly of claim 12, wherein the channel is positioned adjacent the side rails and in the center of the center rail.

14. The cover assembly of claim 11, further comprising a lifting hook on at least one of the panels to facilitate the opening and closing of the cover.

* * * * *